United States Patent [19]

Lee

[11] Patent Number: 5,974,551
[45] Date of Patent: Oct. 26, 1999

[54] POWER SUPPLY DEVICE AND A POWER SUPPLY METHOD FOR A COMPUTER SYSTEM

[75] Inventor: Kyung-Sang Lee, Suwon-si, Rep. of Korea

[73] Assignee: SamSung Electronics Co., Ltd., Suwon, Rep. of Korea

[21] Appl. No.: 08/728,684

[22] Filed: Oct. 10, 1996

[30] Foreign Application Priority Data

Oct. 10, 1995 [KR]  Rep. of Korea ................... 1995/34690

[51] Int. Cl.$^6$ ....................................................... G06F 1/32
[52] U.S. Cl. .......................... 713/300; 713/323; 713/324
[58] Field of Search .............................. 395/750.01, 750; 363/65, 15; 307/66; 379/413; 364/200; 320/14

[56] References Cited

U.S. PATENT DOCUMENTS

| | | | |
|---|---|---|---|
| 4,204,249 | 5/1980 | Dye et al. ................................ | 364/200 |
| 4,980,836 | 12/1990 | Carter et al. . | |
| 5,021,679 | 6/1991 | Fairbanks et al. ........................ | 307/66 |
| 5,032,971 | 7/1991 | Yamada ..................................... | 363/65 |
| 5,163,124 | 11/1992 | Yabe et al. . | |
| 5,173,847 | 12/1992 | Suzuki ..................................... | 363/21 |
| 5,182,810 | 1/1993 | Bartling et al. ......................... | 395/750 |
| 5,218,704 | 6/1993 | Watts, Jr. et al. . | |
| 5,243,269 | 9/1993 | Katayama et al. ........................ | 320/14 |
| 5,283,905 | 2/1994 | Saadeh et al. ........................... | 395/750 |
| 5,341,279 | 8/1994 | Yamada ..................................... | 363/21 |
| 5,408,668 | 4/1995 | Tornai . | |
| 5,408,669 | 4/1995 | Stewart et al. . | |
| 5,437,040 | 7/1995 | Campbell et al. ....................... | 395/750 |
| 5,440,748 | 8/1995 | Sekine et al. ........................... | 395/750 |
| 5,457,801 | 10/1995 | Aihara . | |
| 5,481,732 | 1/1996 | Shahbazi ................................. | 395/750 |
| 5,483,464 | 1/1996 | Song ....................................... | 364/492 |
| 5,517,396 | 5/1996 | Murata .................................... | 363/15 |
| 5,553,296 | 9/1996 | Forrest et al. ......................... | 395/750 |
| 5,588,054 | 12/1996 | Shin et al. .............................. | 379/413 |
| 5,590,343 | 12/1996 | Bolan et al. ............................ | 395/750 |
| 5,657,257 | 8/1997 | Lee ........................................ | 364/707 |

*Primary Examiner*—Ayaz R. Sheikh
*Assistant Examiner*—Eric S. Thlang
*Attorney, Agent, or Firm*—Robert E. Bushnell, Esq.

[57] ABSTRACT

An integrated power supply device and a power supplying method for controlling power supply to a computer system having a main computer body and a monitor. The integrated power supply device includes a wake-up sensor for generating a wake-up signal when the computer system is in use; a power supply controller responsive to said wake-up sensor to control the power supply to the monitor and the main computer body; a power input unit connected to an external power source to transform an alternating current voltage received from the external power source into a constant direct current voltage; a monitor power supply unit responsive to the power supply controller to transform the constant direct current voltage output from the power input unit into a first predetermined voltage and to supply the first predetermined voltage to the monitor for operation; a main body power supply unit responsive to the power supply controller to transform the constant direct current voltage output from the power input unit into a second predetermined voltage and to supply the second predetermined voltage to the main computer body for operation; and a subsidiary power supply unit coupled to the power input unit to transform the constant direct current voltage output from the power input unit into a third predetermined voltage and to supply the third predetermined voltage to the power supply controller for controlling the power supply to the monitor and the main computer body to minimize power consumption.

26 Claims, 5 Drawing Sheets

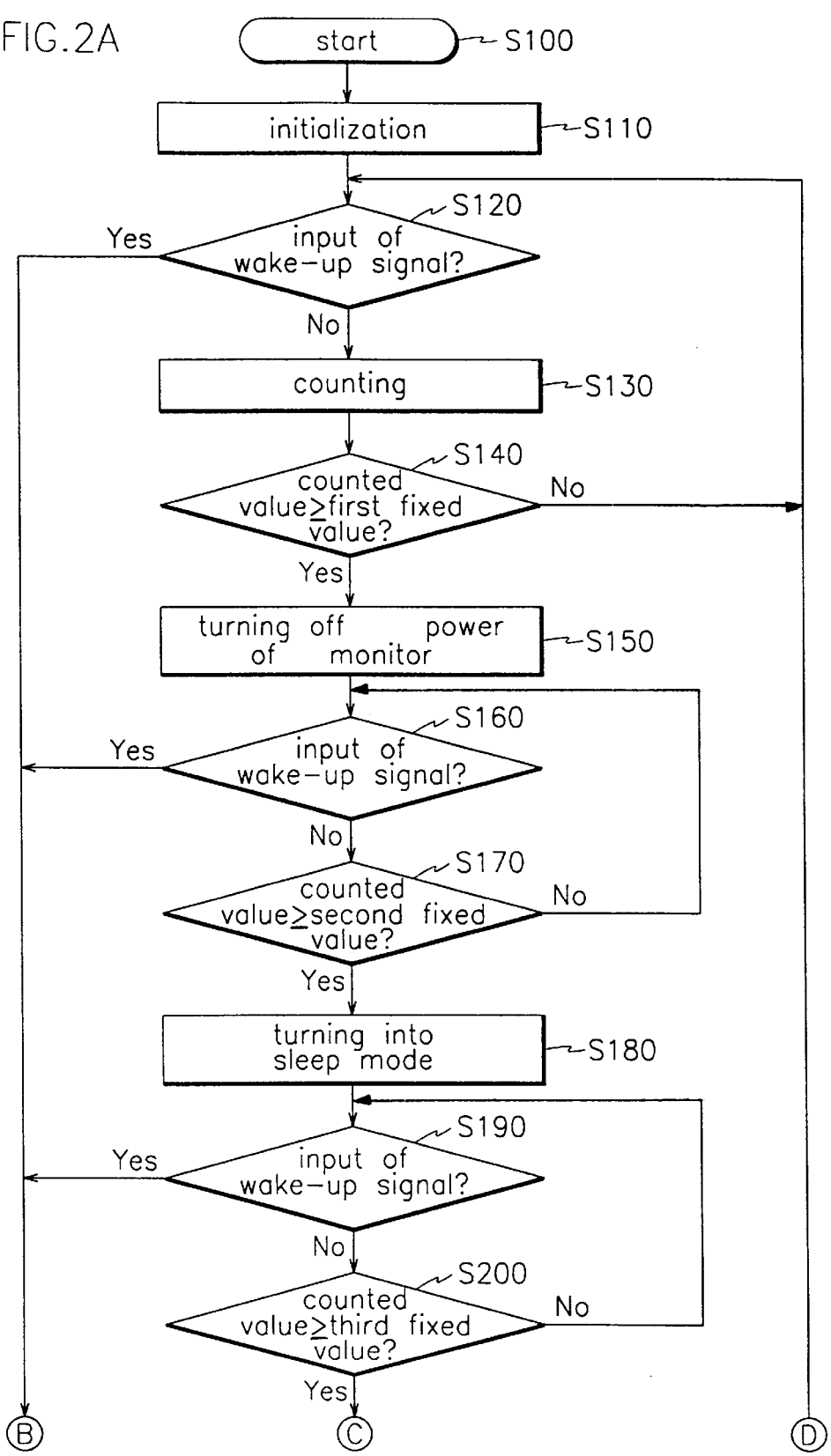

POWER SUPPLY DEVICE AND A POWER SUPPLY METHOD FOR A COMPUTER SYSTEM

CROSS-REFERENCE TO RELATED APPLICATION

This application makes reference to, incorporates the same herein, and claims all benefits accruing under 35 U.S.C. §119 from an application for *A Power Supply Device And A Power Supply Method For A Computer System* earlier filed in the Korean Industrial Property Office on Oct. 10, 1995, and there duly assigned Ser. No. 34690/1995.

BACKGROUND OF THE INVENTION

1. Technical Field

The present invention relates to a power supply device and a power supplying process for a computer system, and more particularly, to a power supply device for efficiently supplying power from a central power supply source to a main computer system and the monitor.

2. Background Art

Conventional personal computer systems generally consist of a main unit (which may have built-in storage devices such as floppy disks, hard disks and CD-ROM), a keyboard and a monitor. The main unit may also be connected to a printer and other peripheral devices. In normal usage, it is common for the monitor and other peripherals to be turned on and to remain on for as long as the computer is running, even though the peripherals are actually used only a small percentage of the time. A typical color video monitor, for example, may consume as such as 50 to 80 percent of the total electrical energy consumed by a personal computer (PC). If the monitor consumes valuable energy only to remain idle, not only the valuable energy resources will be wasted but the life of the monitor will decrease rapidly. Obviously, power can be conserved if the user turn the computer system off or utilizes a standby mode each time the computer system is no longer in use for an extended period. This requirement is, however, impractical. Therefore, a system should be designed to automatically conserve valuable energy resources when the computer system is not in use.

In principle, automatically saving energy by turning off the computer system is fairly easy. Portable computers such as laptop computers disclosed, for example in U.S. Pat. No. 4,980,836 for *Apparatus For Reducing Computer System Power Consumption* issued to Carter et al., U.S. Pat. No. 5,163,124 for *Method And Apparatus For Controlling Power To Device In A Computer System* issued to Yabe et al., U.S. Pat. No. 5,218,704 for *Real-Time Power Conservation For Portable Computers* issued to Watt, Jr. et al. and U.S. Pat. No. 5,249,298 for *Battery-Initiated Touch-Sensitive Power-Up* issued to Bolan et al., contain such power saving features for several years. Typically, the portable computer is invariably designed so that if there is no activity from the keyboard or from other external inputs during a specified time, the computer system is turned off or placed in a standby mode to save energy. Only minimal logic is kept active to detect when the keyboard or other external inputs are becoming active again so as to turn the computer system back on. In portable computers, this power saving feature is fairly simple to implement, since the monitor display is integrated with the computer system. However, for normal desktop personal computers in which a monitor is physically separated from the main computer unit, turning off the external monitor automatically from the main computer unit is much more difficult because most monitor systems are based on standardized data protocols such as VGA, EGA, MGA and CGA that contain no special lines or special commands to turn the power on or off.

Conventional power saving features for normal personal computers having monitors as separate items are disclosed, for example, in U.S. Pat. No. 5,059,961 for *Screen Blanker For A Monitor Of A Computer System* issued to Cheng, U.S. Pat. No. 5,375,245 for *Apparatus For Automatically Reducing The Power Consumption Of A CRT Computer Monitor* issued to Solhjell et al., U.S. Pat. No. 5,389,952 for *Low-Power-Consumption Monitor Standby System* issued to Kikinis, U.S. Pat. No. 5,408,668 for *Method And Apparatus For Controlling The Provision Of Power To Computer Peripherals* issued to Tornai, and recent U.S. Pat. No. 5,483,464 for *Power Saving Apparatus For Use In Peripheral Equipment Of A Computer* issued to Song and assigned to the same assignee of the present invention. Usually, the monitor is shut down during the period of inactivity with the exception of a small amount of power necessary to detect when the computer system becomes active again so as to resume operation of the monitor. Conventional personal computers, however, require separate AC power supply sources for supplying power to the main computer unit and the monitor. This requirement, as I have observed, restricts the efficiency of the power saving feature and fails to control the power supply efficiently. Moreover, using additional expensive power supply devices result in the undesirable increase of production cost.

SUMMARY OF THE INVENTION

Accordingly, it is therefore an object of the present invention to provide an improved power supply and saving device for a personal computer system having a main computer body and a monitor.

It is also an object to provide an integrated power supply and saving device and process of controlling the power supply to both a main computer body and a monitor of a computer system to improve computer energy efficiency.

It is another object to provide an integrated power supply and saving device for an integrated computer system having a single housing structure including a main computer body and a monitor incorporated therein to improve computer energy efficiency.

It is another object to provide an integrated power supply and saving device of a computer system for efficiently supplying power so as to maintain operation of a main computer body and a monitor when the computer system is in a normal mode, to automatically turn off the monitor when the computer system is in a standby mode, to further shut off operation of a hard disk drive and a central processing unit (CPU) contained in the main computer body when the computer system is in a sleep mode, and to finally shut off operation of both the main computer body and the monitor when the computer system is in an off mode.

These and other objects can be obtained by a power saving device for use in a computer system having a monitor and a main computer body, including a wake-up sensor for generating a wake-up signal when the computer system is in use. A power supply controller is responsive to said wake-up sensor to control the power supply to the monitor and the main computer body. A power input unit is connected to an external power source to transform an alternating current voltage received from the external power source into a constant direct current voltage. A monitor power supply unit is responsive to the power supply controller to transform the constant direct current voltage output from the power input unit into a first predetermined voltage and to supply the first predetermined voltage to the monitor for operation. A main body power supply unit is responsive to the power supply controller to transform the constant direct current voltage output from the power input unit into a second predetermined voltage and to supply the second predetermined voltage to the main computer body for operation. A subsidiary power supply unit is coupled to the power input unit to transform the constant direct current voltage output from the power input unit into a third predetermined voltage and to supply the third predetermined voltage to the power supply controller for controlling the power supply to the monitor and the main computer body to minimize power consumption.

A process of controlling the power supply to the monitor and the main computer body of a computer system can be obtained by the following steps: initializing the integrated power supply device upon activation of power; determining whether a wake-up signal is generated in response to activity from input devices indicating that the computer system is in use; when the wake-up signal is not generated in response to non-activity from the input devices indicating that the computer system is not in use, beginning counting until a counted value reaches to one of first, second, and third predetermined value; when the counted value reaches the first predetermined value, cutting off the power supply to the monitor; after the power supply to the monitor is cut off, determining whether the wake-up signal is generated in response to activity from input devices; when the wake-up signal is not generated in response to non-activity from the input devices, determining whether the counted value reaches said second predetermined value greater than said first predetermined value; when the counted value reaches the second predetermined value, reducing the power supply to the main computer body below a predetermined voltage; after the power supply to the main computer body is reduced below the predetermined voltage, continuously determining whether the wake-up signal is generated in response to activity from input devices; when the wake-up signal is not generated in response to non-activity from the input devices, determining whether the counted value reaches said third predetermined value greater than the second predetermined value; when the counted value reaches the third predetermined value, cutting off the power supply to the main computer body; and alternatively, automatically resupplying power to both the monitor and the main computer body whenever the wake-up signal is generated in response to activity from the input devices.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 2A and 2B are flow charts illustrating an operation of an integrated power supply and saving device for a computer system constructed according to the principles of the present invention.

DETAILED DESCRIPTION OF THE PREFERRED EMBODIMENT

Figure 1A:
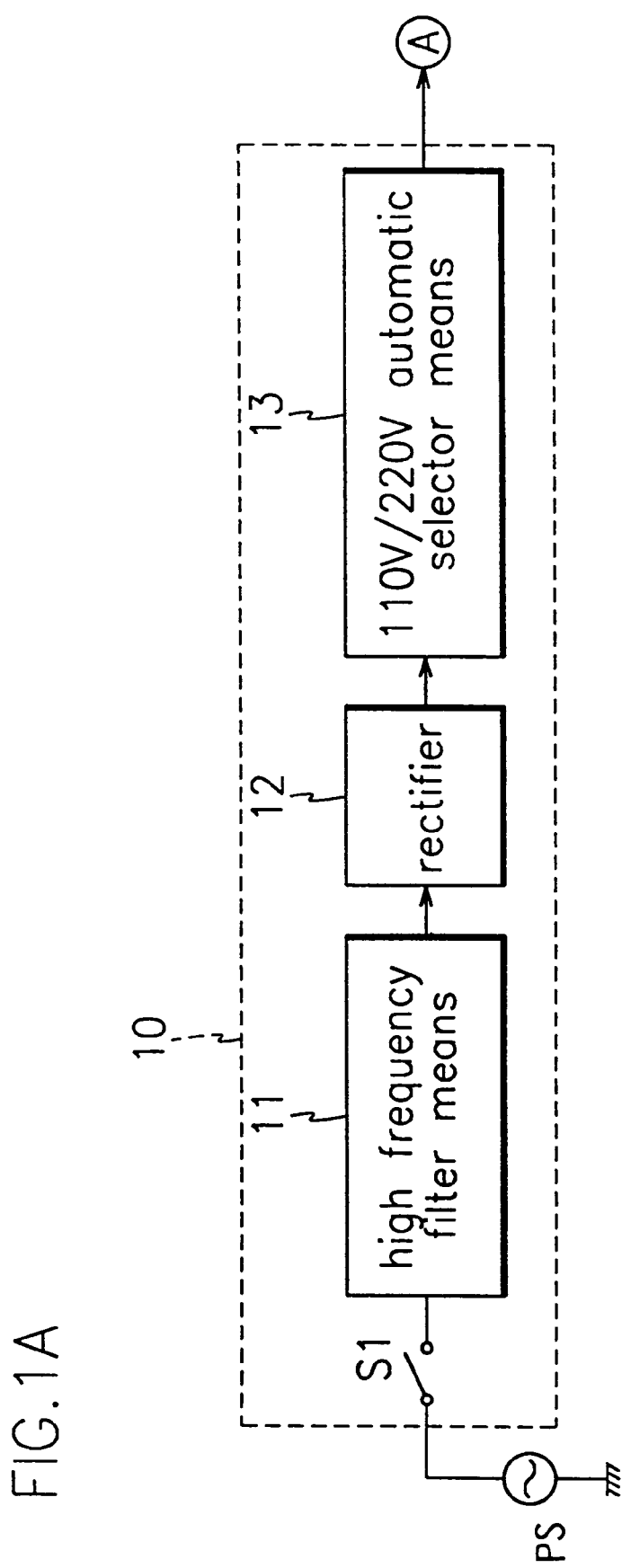
FIGS. 1A and 1B illustrate an integrated power supply and saving device for a computer system constructed according to the principles of the present invention.
Figure 1B:
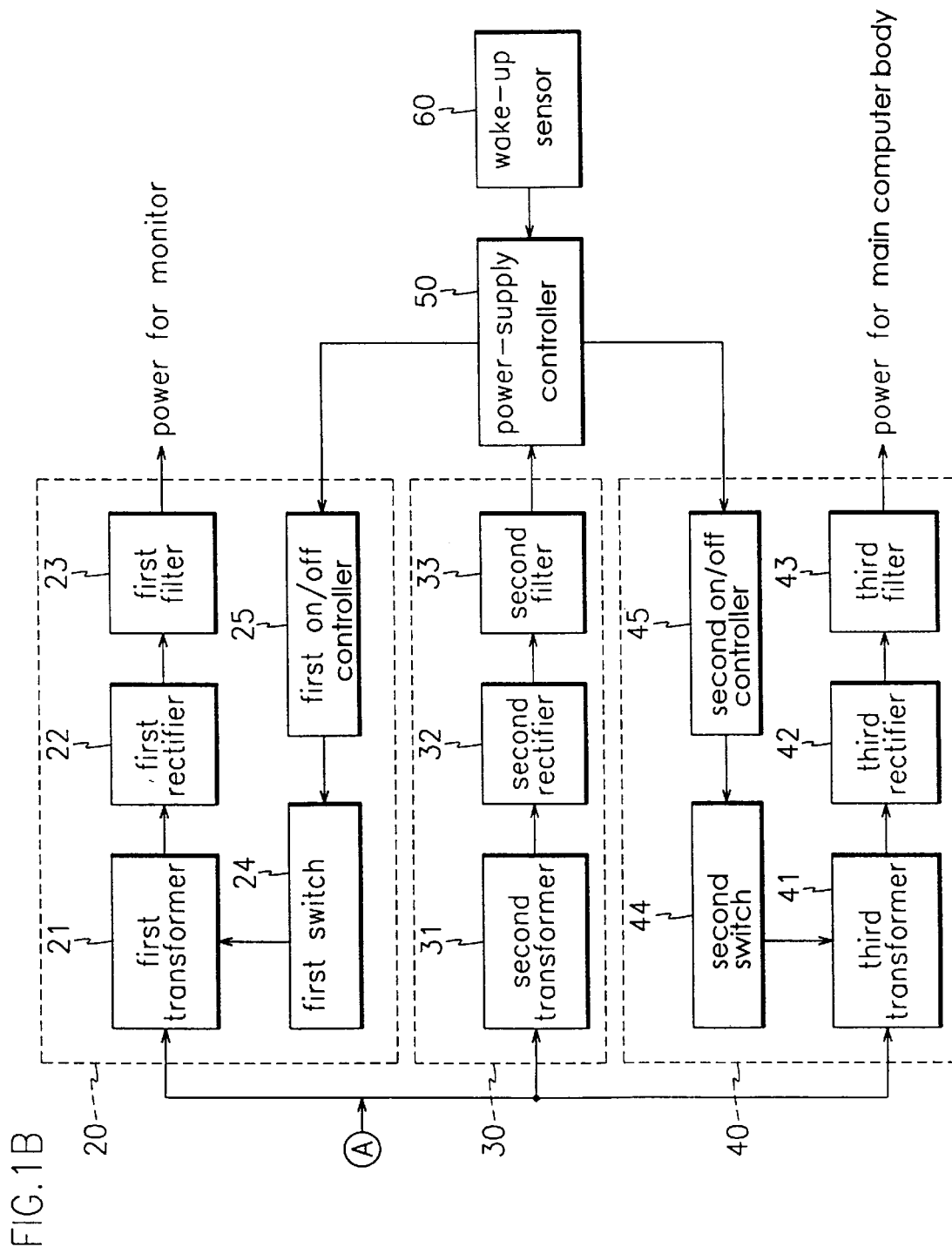

Referring now to the drawings and particularly to FIGS. 1A and 1B, which illustrate an integrated power supply and saving device for a computer system constructed according to the principles of the present invention. The computer system as contemplated by a preferred embodiment of the present invention includes a main computer body and a monitor preferably a cathode-ray tube (CRT) monitor as a separate peripheral item. However, an integrated computer system having a single housing structure including a main computer body and a monitor incorporated therein is also contemplated. The integrated power supply and saving device includes a power input unit 10 for providing power to the computer system for operation, a monitor power supply unit 20 for supplying power to the monitor while the computer system is in use, a subsidiary power supply unit 30, a main computer power supply unit 40 for supplying power to the main computer body while the computer system is in use, a power supply controller 50 as driven by the subsidiary power supply unit 30 for controlling operation of the monitor power supply unit 20 and the main computer supply unit 40 to supply power to the monitor and to the main computer body, and a wake-up sensor 60 for sensing whether the computer system becomes active after a period of inactivity from input devices such as a keyboard, mouse and modem, and for generating a wake-up signal in response to activity from the input devices to the power supply controller 50 to resume operation of the computer system. If the computer system is in continuous use, however, the wake-up sensor 60 is set to generate a continuous wave of wake-up signals informing the power supply controller 50 to continuously supply power to both the monitor and the main computer body. Therefore, when the computer system is no longer in use, no wake-up signal is generated and the power supply controller 50 in response thereto, controls the power supply to the monitor and to the main computer body in order to reduce power consumption. The wake-up sensor 60 can also be set so that, when the computer system is in use, no wake-up signal is generated. Only when the computer system is not in use for an extended period, a wake-up signal may be generated in response to activity from the input devices to the power supply controller 50 to resume operation of the computer system.

As shown in FIG. 1A, the power input unit 10 is connected to an external power source PS for transforming alternating current voltage supplied therefrom into direct current voltage. The direct current voltage is then supplied to each of the monitor power supply unit 20, the subsidiary power supply unit 30 and the main computer power supply unit 40 as shown in FIG. 1B.

The power supply controller 50 determines, based on reception of a wake-up signal generated from the wake-up sensor 60, whether the computer system is in use and generates a power control signal which controls the on-off condition of the power supplied to the monitor and to the main computer body of the computer system when a wake-up signal is not received during a fixed or predetermined period.

The monitor power supply unit 20, in which operating conditions change according to the power control signal output from the power supply controller 50, transforms the direct current voltage output from the power input unit 10 into a relevant voltage and supplies the same to the monitor for use. Similarly, the main computer power supply unit 40, in which operating conditions change according to the power control signal output from the power supply controller 50, transforms the direct current voltage output from the power input unit 10 into a relevant voltage and supplies the same to the main computer body for use. The subsidiary power supply unit 30 also generates a driving voltage to the power supply controller 50 for operation in response to input of a wake-up signal generated from the wake-up sensor 60.

In accordance with a preferred embodiment of the present invention, the power input unit 10 consists of a power switch S1 of which one terminal is connected to an alternating power supply source PS, a high frequency filter 11 which filters high frequency elements of the alternating current voltage supplied corresponding to the operating conditions of the power switch S1, a rectifier 12 which rectifies the alternating current voltage from the high frequency filter 11 into a constant direct current voltage, a 110V/220V automatic selector 13 which outputs a predetermined voltage from which the direct current voltage from the rectifier 12 is transformed. The 110V/220V automatic selector 13 performs a double voltage rectification (110×2×√2) when the supplied voltage is 110 Volts, or alternatively, performs a full wave voltage rectification (220×√2) when the supplied voltage is 220 Volts so as to generate a regular voltage regardless of the actual magnitude of the supplied voltage.

The monitor power supply unit 20 includes a first transformer 21, a first rectifier 22, a first filter 23, a first on/off controller 25 and a first switch 24. The first transformer 21 transforms the direct current voltage from the power input unit 10 into an alternating current voltage amplified to a predetermined level. The first rectifier 22 then rectifies the alternating current voltage from the first transformer 21 into a constant direct current voltage. Once the constant direct current voltage is rectified, the first filter 23 filters noise elements of the direct current voltage from the first rectifier 22. The first on/off controller 25 outputs a power on/off signal corresponding to the power control signal from the power supply controller 50. The first switch 24 is then used to perform a switching function of the direct current voltage received by the first transformer 21 based on the power on/off signal from the first on/off controller 25.

The subsidiary power supply unit 30 includes a second transformer 31 which is connected to the output terminal of the power input unit 10, a second rectifier 32 which is connected to the output terminal of the second transformer 31 and a second filter 33 which is connected to the output terminal of the second rectifier 32. The subsidiary power supply unit 30 generates a driving voltage for driving the power supply controller 50 to control the power supply to the main computer body and the monitor.

The main computer power supply unit 40 includes a third transformer 41, a third rectifier 42 which is connected to the output terminal of the third transformer 41, a third filter 43 which is connected to the output terminal of the third rectifier 42, a second on/off controller 45 and a second switch 44, all of which perform the same functions as their respective counterparts of the monitor power supply unit 20.

Figure 2B:
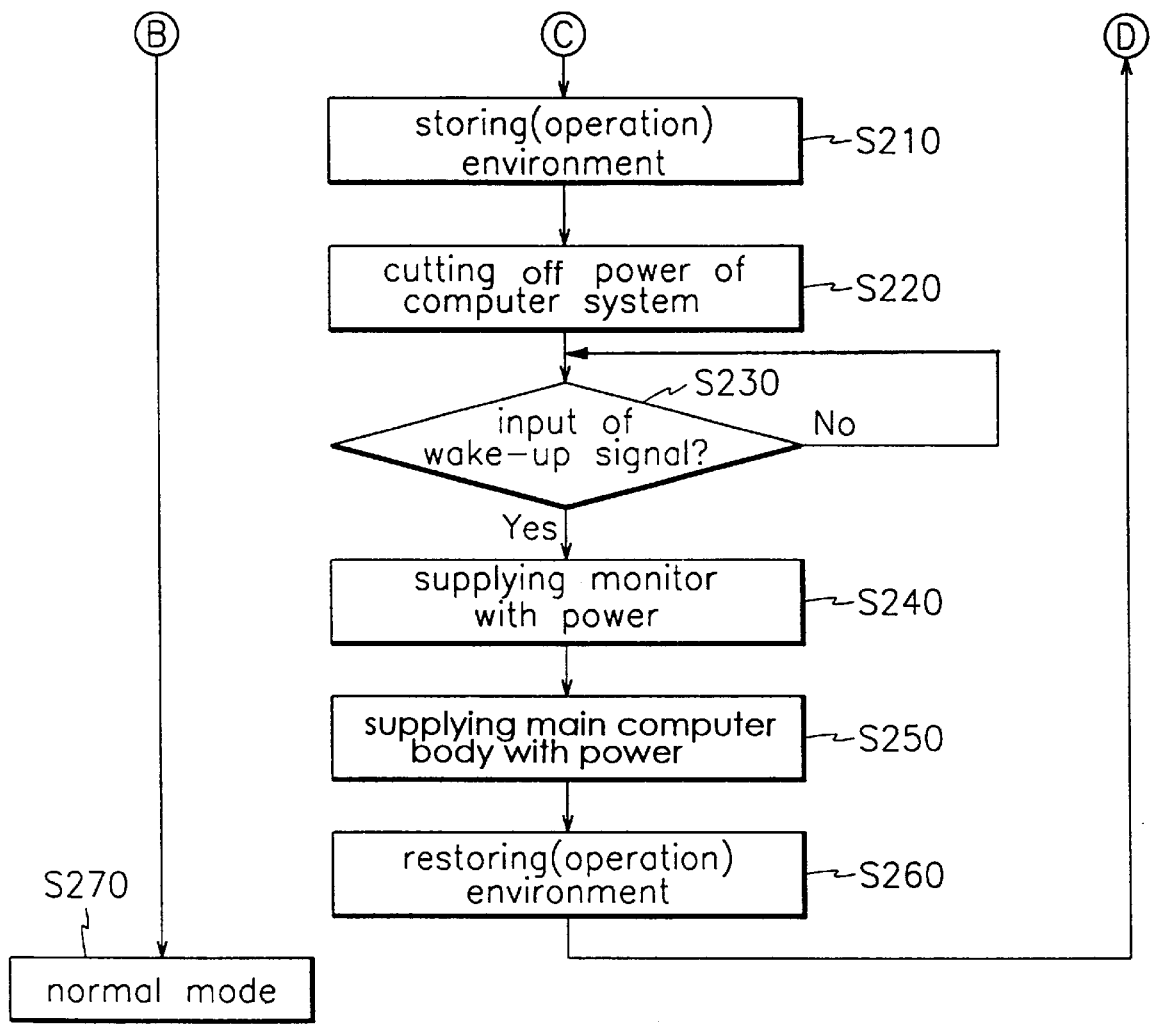

Turning now to FIGS. 2A and 2B which illustrate a process of controlling the power supply to the monitor and the main computer body of a computer system having an integrated power supply and saving device incorporated therein according to the principles of the present invention. As shown in FIG. 2A, when the computer system including a monitor and a main computer body is turned on at step S100, the power supply controller 50 initializes all the components at step S110. Upon initialization, the power supply controller 50 then determines whether a wake-up signal is generated from the wake-up sensor 60 indicating that computer system is either in use or has become active after some period of inactivity from the input devices at step S120. If the wake-up signal is generated from the wake-up sensor 60 indicating that the computer system is in use or has become active after some period of inactivity from the input devices at step S120, however, the power supply controller 50 controls the monitor power supply unit 20 and the main computer power supply unit 40 to continuously supply power to both the monitor and the main computer body during its normal mode of operation.

The wake-up sensor 60 as contemplated by the present invention includes a keyboard controller which generates a key signal corresponding to activity from the keyboard, a fax-modem controller which generates a communication signal corresponding to activity from the fax and modem. If the wake-up signal is not generated from the wake-up sensor 60 at step S120, the power supply controller 50 operates a counter or a timer in order to prevent unnecessary power consumption at step S130.

When a counted value of the counter reaches a first fixed value which is set to turn off the power of the monitor when the wake-up signal is not received from the wake-up sensor 60 at step S140, the power supply controller 50 generates a low level power control signal to the monitor power supply unit 20 in order to turn off power supply to the monitor and to place the computer system in a standby mode at step S150. That is, the first on/off controller 25 of the monitor power-supply unit 20 first generates an off signal in response to the low level power control signal generated from the power supply controller 50. When the off signal is generated, the first switch 24 is turned off to cut off the transmission of the direct current voltage from the power input unit 10 received by the first transformer 21. When the direct current voltage is cut off, the first transformer 21 ceases to transform the direct current voltage from the power input unit 10, and consequently, the voltage supplied to the computer monitor is cut off.

In short, when the wake-up signal is not generated from the wake-up sensor 60 indicating that the computer system is not in use for a predetermined period corresponding to the first fixed value set to turn off the monitor, the power supply controller 50 cuts off the power supplied to the monitor and continues to monitor for the wake-up signal which is only generated from the wake-up sensor 60 in response to activity from the input devices such as a keyboard, mouse or modem. If the wake-up signal is generated from the wake-up sensor 60 indicating that the computer system has become active at step S160 after the monitor is turned off and the computer system is placed in a standby mode at step S150, however, the power supply controller 50 controls the monitor power supply unit 20 and the main computer power supply unit 40 to resupply power to the monitor and maintain the power supply to the main computer body for its normal mode of operation.

If the wake-up signal is still not generated from the wake-up sensor 60 after the monitor is turned off and the computer system is placed in a standby mode so as to reduce power consumption, however, the power supply controller 50 continues to count the counter and determines whether a counted value of the counter reaches a second fixed value which is set longer than the first fixed value to place the computer system in a sleep mode to save power consumption at step S170.

When the counted value reaches the second fixed value at step S170, the power supply controller 50 cuts off power supply to a hard disk drive (HDD) and a central processing unit (CPU) of the main computer body and turns the computer system into a sleep-mode at step S1180. If the counted value is less than the second fixed value at step S170, the power supply controller 50 returns to step S160 to monitor the counted value until the same counted value reaches the second fixed value. When the computer system is in a sleep mode, the power supplied to the computer main body is reduced below a fixed voltage to minimize the power-consumption after the power supply to the monitor is cut off.

Again, after the computer system is placed in the sleep mode, the power-supply controller 50 continues to monitor for the wake-up signal from the wake-up sensor 60 at step S190. If the wake-up signal is generated from the wake-up sensor 60 indicating that the computer system has become active after the computer system is placed in a sleep mode at step S190, however, the power supply controller 50 controls the monitor power supply unit 20 and the main computer power supply unit 40 to resupply power to the monitor and to the main computer body for its normal mode of operation. When the wake-up signal is not generated from the wake-up sensor 60 after the computer system is placed in the sleep mode at step S190, however, the power supply controller 50 determines whether a counted value of the counter reaches a third fixed value which is set greater than the second fixed value to place the entire computer system in an off mode at step S200. Power supply to the entire computer system is cut off at this step. If the counted value of the counter is less than the third fixed value at step S200, the power supply controller 50 returns to step S190 to monitor the counted value until the same counted value reaches the third fixed value.

When the counted value of the counter reaches the third fixed value at step S200, however, operating data of the current task is stored in a subsidiary memory device (not shown) at step S210, and the power supplied to the remaining main computer body is cut off at step S220. That is, the computer system including the monitor and the main computer body is turned off in its off mode. If the wake up signal is not generated from the wake-up sensor 50 within a predetermined period corresponding to the third fixed value, the power supply controller 50 switches the computer system from the sleep mode to an off mode and generates a low level power control signal to the main computer power supply unit 40 so as to cut off power supply to the main computer body. That is, the second on/off controller 45 of the main computer power supply unit 40 generates an off signal and, accordingly, the switching operation of the second switch 44 is turned off. The direct current voltage input into the third transformer 41 is cut off and the power of the main computer body is cut off.

Even if the direct current voltage supplied to the main computer body is cut off, voltage is continuously supplied to the power supply controller 50 through the subsidiary power supply unit 30 and senses the occurrence of the wake-up signal when the user forgets to turn off the power switch S1. Under the off mode, the power supply controller 50 senses the input of the wake-up signal and, if the wake-up signal is not input continuously, maintains the computer system in the off mode until the wake-up signal is input from the wake-up sensor 60 to prevent unnecessary power-consumption at step S230.

Even when the power supply to the computer monitor is cut of, or when the computer system is in a sleep mode or an off mode, the input of the wake-up signal corresponding to the operation of a keyboard, fax, or modem allows the power supply controller 50 to switch the computer system back into a normal mode of operation. Then, the power supply controller 50 generates a power control signal of a high level into the computer monitor power supply unit 20 and the main computer power supply unit 40 in order to operate the function corresponding to the wake-up signal.

When the power control signal of a high level is generated from the power supply controller 50, the on/off controllers 25 and 45 respectively generates an on signal for supplying power and, thereby, the switching operation of the first and second switches 24 and 44 is turned on. Then, the direct current voltage from the power input unit 10 is transformed to a fixed voltage by the first and third transformers 21 and 41 and is supplied to the computer monitor at step S240 and to the computer main body at step S250 through the rectifiers 22 and 42 and the filters 23 and 43 so as to allow the computer system to resume operation.

Figure 3:
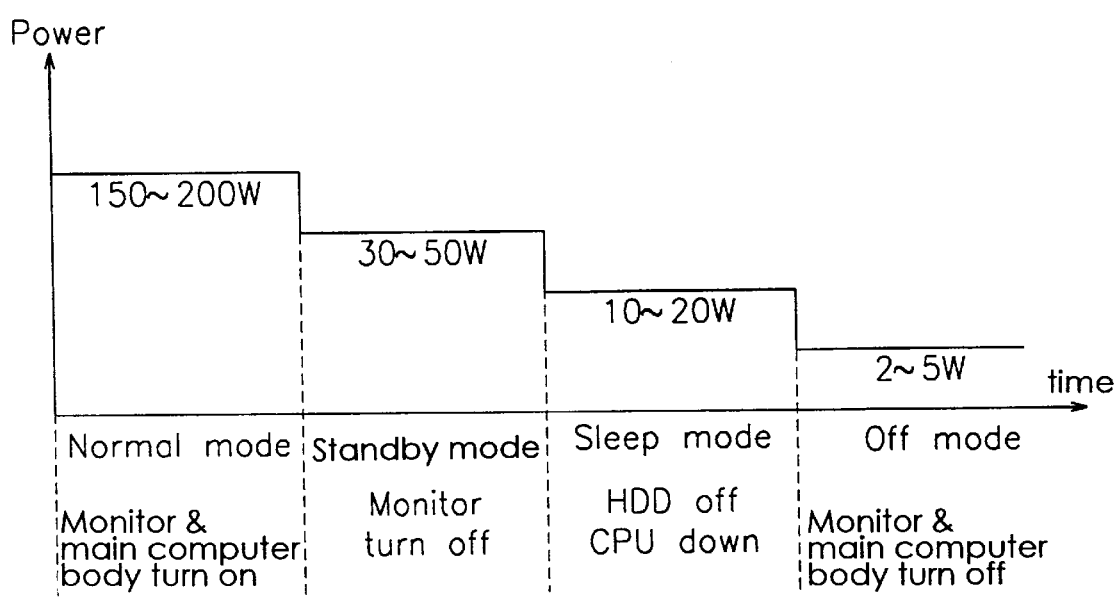
FIG. 3 is a power state diagram of different modes of operation of a computer system having an integrated power supply and saving device incorporated therein according to the principles of the present invention.

FIG. 3 illustrates a power state diagram of a normal mode, standby mode, sleep mode and off mode of operation of a computer system having an integrated power supply and saving device incorporated therein according to the principles of the present invention. As shown in FIG. 3, when the computer system including the monitor and the main computer body is turned on in its normal mode of operation, the power supply to the computer system is approximately 150–200 Watts. After the computer system is turned on and there is a period of inactivity from the input devices such as a keyboard, mouse and modem indicating that the computer system is not in use for a first fixed period corresponding to the first fixed value set for the counter, the power supply to the monitor is cut off and the computer system is placed in a standby mode. Power is still supplied to the main computer body at approximately 30–50 Watts. If the period of inactivity from the input devices is longer than the first fixed period and exceeds a second fixed period corresponding to the second fixed value set for the counter, the power supply to the hard disk drive (HDD) and the central processing unit (CPU) of the main computer body is cut off and the computer system is placed in a sleep mode. Power is still supplied to certain critical components of the main computer body at approximately 10–20 Watts so that when the computer system becomes active again, both the monitor and the main computer body can be quickly re-energized back to its normal mode of operation. However, if the computer system is not in use for a prolong period. That is, if the period of inactivity from the input devices is longer than the first and second fixed periods and exceeds a third fixed period corresponding to the third fixed value set for the counter, the power supply to the main computer body is cut off and the computer system is placed in an off mode. Power supply to certain critical components of the main computer body is reduced to 2–5 Watts.

As described above, the integrated power supply and saving device of the present invention effectively regulates the power supply to both the main computer body and the monitor of a computer system to improve computer energy efficiency. Moreover, the integrated power supply device as constructed according to the present invention advantageously seeks to integrate power supply to the both the monitor and the main computer body of the computer system from a single power source and thereby minimizing the production cost.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A power supply device for a computer system having a monitor and a main computer body, said power supply device comprising:

a wake-up sensor generating a wake-up signal when the computer system is in use;

a power supply controller responsive to said wake-up sensor, controlling the power supply to the monitor and the main computer body;

a power input unit connected to an external power source, transforming an alternating current voltage received from said external power source into a constant direct current voltage;

a monitor power supply unit responsive to said power supply controller, transforming the constant direct current voltage output from said power input unit into a first predetermined voltage and supplying said first predetermined voltage to the monitor for operation;

a main body power supply unit responsive to said power supply controller, transforming the constant direct current voltage output from said power input unit into a second predetermined voltage and supplying said second predetermined voltage to the main computer body for operation; and a subsidiary power supply unit transforming the constant direct current voltage output from said power input unit into a third predetermined voltage and supplying said third predetermined voltage to said power supply controller for controlling the power supply to the monitor and the main computer body.

2. The power supply device of claim 1, further comprised of said power input unit comprising:

a power switch operable in one of an "on" mode and an "off" mode, for enabling an operator to physically turn "on" and turn "off" the computer system;

a high frequency filter connected to said power switch, for filtering high frequency elements from the alternating current voltage supplied from said external power source when said power switch is turned "on";

a rectifier connected to said high frequency filter, for filtering the alternating current voltage output from said high frequency filter and generating the direct current voltage therefrom;

an automatic selector connected to said rectifier, for generating the constant direct current voltage in response to reception of the direct current voltage output from said rectifier.

3. The power supply device of claim 2, further comprised of said automatic selector performing a double voltage rectification of the supplied direct voltage when the supplied direct voltage is 110 Volts, and a full wave voltage rectification of the supplied direct voltage when the supplied direct voltage is 220 Volts.

4. The power supply device of claim 1, further comprised of said monitor power supply unit comprising:

a first transformer coupled to receive the constant direct current voltage from said power input unit, for transforming the constant direct current voltage into an alternating current voltage;

a first rectifier connected to said first transformer, for rectifying the alternating current voltage from said first transformer into a first direct current voltage;

a first filter connected to said first rectifier, for filtering noise elements from the first direct current voltage from the first rectifier and producing said first predetermined voltage to the monitor for operation;

a first on/off control unit responsive to said power supply controller, for generating a power on/off signal corresponding to a power control signal exhibiting a first logic state from said power supply controller; and a first switching unit connected to said first on/off control unit, for limiting an input of the constant direct current voltage from said power input unit into said first transformer according to the power on/off signal.

5. A power supply device for a computer system having a monitor and a main computer body, said power supply device comprising:

a wake-up sensor for generating a wake-up signal when the computer system is in use;

a power supply controller responsive to said wake-up sensor, for controlling the power supply to the monitor and the main computer body;

a power input unit connected to an external power source, for transforming an alternating current voltage received from said external power source into a constant direct current voltage;

a monitor power supply unit responsive to said power supply controller, for transforming the constant direct current voltage output from said power input unit into a first predetermined voltage and supplying said first predetermined voltage to the monitor for operation;

a main body power supply unit responsive to said power supply controller, for transforming the constant direct current voltage output from said power input unit into a second predetermined voltage and supplying said second predetermined voltage to the main computer body for operation;

a subsidiary power supply unit for transforming the constant direct current voltage output from said power input unit into a third predetermined voltage and supplying said third predetermined voltage to said power supply controller for controlling the power supply to the monitor and the main computer body;

said monitor power supply unit further comprising:
        a first transformer coupled to receive the constant direct current voltage from said power input unit, for transforming the constant direct current voltage into an alternating current voltage;
        a first rectifier connected to said first transformer, for rectifying the alternating current voltage from said first transformer into a first direct current voltage;
        a first filter connected to said first rectifier, for filtering noise elements from the first direct current voltage from the first rectifier and producing said first predetermined voltage to the monitor for operation;
        a first on/off control unit responsive to said power supply controller, for generating a power on/off signal corresponding to a power control signal exhibiting a first logic state from said power supply controller; and a first switching unit connected to said first on/off control unit, for limiting an input of the constant direct current voltage from said power input unit into said first transformer according to the power on/off signal; and said subsidiary power supply unit further comprising:

a second transformer coupled to receive the constant direct current voltage output from said power input unit, for transforming the constant direct current voltage into an alternating current voltage;

a second rectifier connected to said second transformer, for rectifying the alternating current voltage from said second transformer into a second direct current voltage; and a second filter connected to said second rectifier, for filtering noise elements from the second direct current voltage output from the second rectifier and producing said third predetermined voltage to said power supply controller.

6. The power supply device of claim 5, further comprised of said main body power supply unit comprising:

a third transformer coupled to receive the constant direct current voltage output from said power input unit, for transforming the constant direct current voltage into an alternating current voltage;

a third rectifier connected to said third transformer, for rectifying the alternating current voltage from said third transformer into a third direct current voltage;

a third filter connected to said third rectifier, for filtering noise elements from the third direct current voltage output from the third rectifier and producing said second predetermined voltage to the main computer body for operation;

a second on/off control unit responsive to said power supply controller, for generating a power on/off signal corresponding to a power control signal exhibiting a second logic state output from said power supply controller; and a second switching unit connected to said second on/off control unit, for limiting an input of the constant direct current voltage from said power input unit into said third transformer according to the power on/off signal.

7. The power supply device of claim 6, further comprised of said power input unit comprising:

a power switch operable in one of an "on" mode and an "off" mode, for enabling an operator to physically turn "on" and turn "off" the computer system;

a high frequency filter connected to said power switch, for filtering high frequency elements from the alternating current voltage supplied from said external power source when said power switch is turned "on";

a fourth rectifier connected to said high frequency filter, for filtering the alternating current voltage output from said high frequency filter and generating the direct current voltage therefrom;

an automatic selector connected to said fourth rectifier, for generating the constant direct current voltage in response to reception of the direct current voltage output from said fourth rectifier.

8. The power supply device of claim 7, further comprised of said automatic selector performing a double voltage rectification of the supplied direct voltage when the supplied direct voltage is 110 Volts, and a full wave voltage rectification of the supplied direct voltage when the supplied direct voltage is 220 Volts.

9. A method for controlling power supply to a computer system having a main computer body, a monitor and input devices using an integrated power supply device, said method comprising the steps of:

initializing said integrated power supply device upon activation of power;

supplying power from said integrated power supply device to the computer system for use including both the main computer body and the monitor, wherein said integrated power supply device comprises a first power supply unit and a second power supply unit, said first power supply unit supplying power to the monitor, and said second power supply unit supplying power to the main computer body;

determining whether there is activity from input devices indicating that the computer system is in use;

when there is activity from the input devices indicating that the computer system is in use, maintaining the power supply from said integrated power supply device to both the main computer body and the monitor;

when there is no activity from the input devices indicating that the computer system is not in use, starting a timer having a first, second, and third predetermined period;

when said timer reaches said first predetermined period, cutting off the power supply to the monitor;

after the power supply to the monitor is cut off, determining whether there is still no activity from the input devices;

when there is activity from the input devices, resupplying power back to the monitor and maintaining the power supply from said integrated power supply device to both the main computer body and the monitor;

when there is still no activity from the input devices, cutting off the power supply to a hard disk drive and a central processing unit of the main computer body when said timer reaches said second predetermined period longer than said first predetermined period;

after the power supply to the hard disk drive and the central processing unit of the main computer body is cut off, determining whether there is still no activity from the input devices;

when there is activity from the input devices, resupplying power back to the monitor, the hard disk drive and the central processing unit of the main computer body, and maintaining the power supply from said integrated power supply device to both the main computer body and the monitor; and when there is still no activity from the input devices, cutting off the power supply to the main computer body until there is activity from the input devices when said timer reaches said third predetermined period longer than said second predetermined period.

10. A method for controlling power supply to a computer system having a main computer body, a monitor and input devices using an integrated power supply device, said method comprising the steps of:

initializing said integrated power supply device upon activation of power;

determining whether a wake-up signal is generated in response to activity from input devices indicating that the computer system is in use;

when the wake-up signal is not generated in response to non-activity from the input devices indicating that the computer system is not in use, beginning counting until a counted value reaches to one of first, second, and third predetermined value;

when the counted value reaches said first predetermined value, cutting off the power supply to the monitor;

after the power supply to the monitor is cut off, determining whether the wake-up signal is generated in response to activity from input devices;

when the wake-up signal is not generated in response to non-activity from the input devices, determining whether the counted value reaches said second predetermined value greater than said first predetermined value;

when the counted value reaches said second predetermined value, reducing the power supply to the main computer body below a predetermined voltage;

after the power supply to the main computer body is reduced below said predetermined voltage, continuously determining whether the wake-up signal is generated in response to activity from input devices;

when the wake-up signal is not generated in response to non-activity from the input devices, determining whether the counted value reaches said third predetermined value greater than said second predetermined value;

when the counted value reaches said third predetermined value, cutting off the power supply to the main computer body; and alternatively, automatically resupplying power to both the monitor and the main computer body whenever the wake-up signal is generated in response to activity from the input devices.

11. An apparatus, comprising:

an integrated computer system having a single housing structure including a main computer body and a monitor incorporated;

input devices connected to the main computer body; and an integrated power supply device, for supplying power to both the monitor and the main computer body for operation upon activation of a power switch, said integrated power supply device controlling the power supply to the monitor and the main computer body based upon activity from the input devices indicating that said computer system is in use, wherein said integrated power supply device further comprises a first power supply unit supplying power to the monitor and a second power supply unit supplying power to the main computer body.

12. The apparatus of claim 11, wherein said integrated power supply device further comprises:

a wake-up sensor generating a wake-up signal when said computer system is in use;

a power supply controller being responsive to said wake-up sensor, said power supply controller controlling the power supply to the monitor and the main computer body;

a power input unit being connected to an external power source, said power input unit transforming an alternating current voltage received from the external power source into a constant direct current voltage;

said first power supply unit corresponding to a monitor power supply unit and being responsive to said power supply controller, the monitor power supply unit transforming the constant direct current voltage output from said power input unit into a first predetermined voltage and supplying said first predetermined voltage to the monitor for operation;

said second power supply unit corresponding to a main body power supply unit and being responsive to said power supply controller, the main body power supply unit transforming the constant direct current voltage output from said power input unit into a second predetermined voltage and supplying said second predetermined voltage to the main computer body for operation; and a subsidiary power supply unit transforming the constant direct current voltage output from said power input unit into a third predetermined voltage and supplying said third predetermined voltage to said power supply controller for controlling the power supply to the monitor and the main computer body.

13. The apparatus of claim 12, further comprised of said power input unit comprising:

said power supply switch operable in one of an "on" mode and an "off" mode, for enabling an operator to physically turn "on" and turn "off" said computer system;

a high frequency filter connected to said power switch, for filtering high frequency elements from the alternating current voltage supplied from said external power source when said power switch is turned "on";

a rectifier connected to said high frequency filter, for filtering the alternating current voltage output from said high frequency filter and generating the direct current voltage therefrom;

an automatic selector connected to said rectifier, for generating the constant direct current voltage in response to reception of the direct current voltage output from said rectifier.

14. The apparatus of claim 13, further comprised of said automatic selector performing a double voltage rectification of the supplied direct voltage when the supplied direct voltage is 110 Volts, and a full wave voltage rectification of the supplied direct voltage when the supplied direct voltage is 220 Volts.

15. The apparatus of claim 12, further comprised of said monitor power supply unit comprising:

a first transformer coupled to receive the constant direct current voltage output from said power input unit, for transforming the constant direct current voltage into an alternating current voltage;

a first rectifier connected to said first transformer, for rectifying the alternating current voltage from said first transformer into a first direct current voltage;

a first filter connected to said first rectifier, for filtering noise elements from the first direct current voltage output from the first rectifier and producing said first predetermined voltage to the monitor for operation;

a first on/off control unit responsive to said power supply controller, for generating a power on/off signal corresponding to a power control signal exhibiting a first logic state output from said power supply controller; and a first switching unit connected to said first on/off control unit, for limiting an input of the constant direct current voltage from said power input unit into said first transformer according to the power on/off signal.

16. An apparatus, comprising:

an integrated computer system having a single housing structure including a main computer body and a monitor incorporated;

input devices connected to the main computer body;

an integrated power supply device, for supplying power to both the monitor and the main computer body for operation upon activation of a power switch, said integrated power supply device controlling the power supply to the monitor and the main computer body based upon activity from the input devices indicating that said computer system is in use;

said integrated power supply device further comprising:

a wake-up sensor for generating a wake-up signal when said computer system is in use;

a power supply controller responsive to said wake-up sensor, for controlling the power supply to the monitor and the main computer body;

power input unit connected to an external power source, for transforming an alternating current voltage received from said external power source into a constant direct current voltage;

a monitor power supply unit responsive to said power supply controller, for transforming the constant direct current voltage output from said power input unit into a first predetermined voltage and supplying said first predetermined voltage to the monitor for operation;

a main body power supply unit responsive to said power supply controller, for transforming the constant direct current voltage output from said power input unit into a second predetermined voltage and supplying said second predetermined voltage to the main computer body for operation; and a subsidiary power supply unit for transforming the constant direct current voltage output from said power input unit into a third predetermined voltage and supplying said third predetermined voltage to said power supply controller for controlling the power supply to the monitor and the main computer body;

said monitor power supply unit further comprising:

a first transformer coupled to receive the constant direct current voltage output from said power input unit, for transforming the constant direct current voltage into an alternating current voltage;

a first rectifier connected to said first transformer, for rectifying the alternating current voltage from said first transformer into a first direct current voltage;

a first filter connected to said first rectifier, for filtering noise elements from the first direct current voltage output from the first rectifier and producing said first predetermined voltage to the monitor for operation;

a first on/off control unit responsive to said power supply controller, for generating a power on/off signal corresponding to a power control signal exhibiting a first logic state output from said power supply controller; and a first switching unit connected to said first on/off control unit, for limiting an input of the constant direct current voltage from said power input unit into said first transformer according to the power on/off signal;

said subsidiary power supply unit further comprising:

a second transformer coupled to receive the constant direct current voltage output from said power input unit, for transforming the constant direct current voltage into an alternating current voltage;

a second rectifier connected to said second transformer, for rectifying the alternating current voltage from said second transformer into a second direct current voltage; and a second filter connected to said second rectifier, for filtering noise elements from the second direct current voltage output from the second rectifier and producing said third predetermined voltage to said power supply controller.

17. The apparatus of claim 16, further comprised of said main body power supply unit comprising:

a third transformer coupled to receive the constant direct current voltage output from said power input unit, for transforming the constant direct current voltage into an alternating current voltage;

a third rectifier connected to said third transformer, for rectifying the alternating current voltage from said third transformer into a third direct current voltage;

a third filter connected to said third rectifier, for filtering noise elements from the third direct current voltage output from the third rectifier and producing said second predetermined voltage to the main computer body for operation;

a second on/off control unit responsive to said power supply controller, for generating a power on/off signal corresponding to a power control signal exhibiting a second logic state output from said power supply controller; and a second switching unit connected to said second on/off control unit, for limiting an input of the constant direct current voltage from said power input unit into said third transformer according to the power on/off signal.

18. The apparatus of claim 17, further comprised of said power input unit comprising:

a power switch operable in one of an "on" mode and an "off" mode for enabling an operator to physically turn "on" and turn "off" said computer system;

a high frequency filter connected to said power switch, for filtering high frequency elements from the alternating current voltage supplied from said external power source when said power switch is turned "on";

a fourth rectifier connected to said high frequency filter, for filtering the alternating current voltage output from said high frequency filter and generating the direct current voltage therefrom;

an automatic selector connected to said fourth rectifier, for generating the constant direct current voltage in response to reception of the direct current voltage output from said fourth rectifier.

19. The apparatus of claim 18, further comprised of said automatic selector performing a double voltage rectification of the supplied direct voltage when the supplied direct voltage is 110 Volts, and a full wave voltage rectification of the supplied direct voltage when the supplied direct voltage is 220 Volts.

20. A computer system, comprising:

a main computer unit containing a central processing unit and auxiliary devices;

a monitor operatively connected to said main computer unit;

input devices operatively connected to said main computer unit; and an integrated power supply device included in said main computer unit, for concomitantly supplying power to the monitor, the central processing unit and the auxiliary devices for operation upon activation of a power switch, said integrated power supply device controlling the sequential selective power supply to the monitor, the central processing unit and the auxiliary devices based upon occurrence of one of an activity and non-activity from the input devices indicating whether the computer system is in use, wherein said integrated power supply device comprises a first power supply unit and a second power supply unit, said first power supply unit supplying power to the monitor, and said second power supply unit supplying power to the main computer unit.

21. The computer system of claim 20, wherein said integrated power supply device further comprises:

a wake-up sensor for generating a wake-up signal when the computer system is in use;

a power supply controller responsive to said wake-up sensor, for controlling the power supply to the monitor and the main computer unit including the central processing unit and the auxiliary devices;

a power input unit connected to an external power source, for transforming an alternating current voltage received from said external power source into a constant direct current voltage;

said first power supply unit corresponding to a monitor power supply unit and being responsive to said power supply controller, said monitor power supply unit transforming the constant direct current voltage output from said power input unit into a first predetermined voltage and supplying said first predetermined voltage to the monitor for operation;

said second power supply unit corresponding to a main body power supply unit and being responsive to said power supply controller, said main body power supply unit transforming the constant direct current voltage output from said power input unit into a second predetermined voltage and supplying said second predetermined voltage to the main computer unit for operation; and a subsidiary power supply unit for transforming the constant direct current voltage output from said power input unit into a third predetermined voltage and supplying said third predetermined voltage to said power supply controller for controlling the power supply to the monitor and the main computer unit.

22. The computer system of claim 21, further comprised of said power input unit comprising:

said power switch operable in one of an "on" mode and an "off" mode, for enabling an operator to physically turn "on" and turn "off" the computer system;

a high frequency filter connected to said power switch, for filtering high frequency elements from the alternating current voltage supplied from said external power source when said power switch is turned "on";

a rectifier connected to said high frequency filter, for filtering the alternating current voltage output from said high frequency filter and generating the direct current voltage therefrom;

an automatic selector connected to said rectifier, for generating the constant direct current voltage in response to reception of the direct current voltage output from said rectifier.

23. The computer system of claim 22, further comprised of said automatic selector performing a double voltage rectification of the supplied direct voltage when the supplied direct voltage is 110 Volts, and a full wave voltage rectification of the supplied direct voltage when the supplied direct voltage is 220 Volts.

24. The computer system of claim 23, further comprised of said monitor power supply comprising:

a first transformer coupled to receive the constant direct current voltage output from said power input unit, for transforming the constant direct current voltage into an alternating current voltage;

a first rectifier connected to said first transformer, for rectifying the alternating current voltage from said first transformer into a first direct current voltage;

a first filter connected to said first rectifier, for filtering noise elements from the first direct current voltage output from the first rectifier and producing said first predetermined voltage to the monitor for operation;

a first on/off control unit responsive to said power supply controller, for generating a power on/off signal corresponding to a power control signal exhibiting a first logic state output from said power supply controller; and a first switching unit connected to said first on/off control unit, for limiting an input of the constant direct current voltage from said power input unit into said first transformer according to the power on/off signal.

25. A computer system comprising:

a main computer unit containing a central processing unit and auxiliary devices;

a monitor operatively connected to said main computer unit:

input devices operatively connected to said main computer unit;

an integrated power supply device included in said main computer unit, for concomitantly supplying power to the monitor, the central processing unit and the auxiliary devices for operation upon activation of a power switch, said integrated power supply device controlling the sequential selective power supply to the monitor, the central processing unit and the auxiliary devices based upon occurrence of one of an activity and non-activity from the input devices indicating whether the computer system is in use;

said integrated power supply device further comprising:

a wake-up sensor for generating a wake-up signal when the computer system is in use;

a power supply controller responsive to said wake-up sensor, for controlling the power supply to the monitor and the main computer unit including the central processing unit and the auxiliary devices;

a power input unit connected to an external power source, for transforming an alternating current voltage received from said external power source into a constant direct current voltage;

a monitor power supply unit responsive to said power supply controller, for transforming the constant direct current voltage output from said power input unit into a first predetermined voltage and supplying said first predetermined voltage to the monitor for operation;

a main body power supply unit responsive to said power supply controller, for transforming the constant direct current voltage output from said power input unit into a second predetermined voltage and supplying said second predetermined voltage to the main computer unit for operation; and a subsidiary power supply unit for transforming the constant direct current voltage output from said power input unit into a third predetermined voltage and supplying said third predetermined voltage to said power supply controller for controlling the power supply to the monitor and the main computer unit;

said power input unit further comprising:

said power switch operable in one of an "on" mode and an "off" mode, for enabling an operator to physically turn "on" and turn "off" the computer system;

a high frequency filter connected to said power switch, for filtering high frequency elements from the alternating current voltage supplied from said external power source when said power switch is turned "on";

a rectifier connected to said high frequency filter, for filtering the alternating current voltage output from said high frequency filter and generating the direct current voltage therefrom; and an automatic selector connected to said rectifier, for generating the constant direct current voltage in response to reception of the direct current voltage output from said rectifier, said automatic selector performing a double voltage rectification of the supplied direct voltage when the supplied direct voltage is 110 Volts, and a full wave voltage rectification of the supplied direct voltage when the supplied direct voltage is 220 Volts;

said monitor power supply further comprising:

a first transformer coupled to receive the constant direct current voltage output from said power input unit, for transforming the constant direct current voltage into an alternating current voltage;

a first rectifier connected to said first transformer, for rectifying the alternating current voltage from said first transformer into a first direct current voltage;

a first filter connected to said first rectifier, for filtering noise elements from the first direct current voltage output from the first rectifier and producing said first predetermined voltage to the monitor for operation;

a first on/off control unit responsive to said power supply controller, for generating a power on/off signal corresponding to a power control signal exhibiting a first logic state output from said power supply controller; and a first switching unit connected to said first on/off control unit, for limiting an input of the constant direct current voltage from said power input unit into said first transformer according to the power on/off signal;

said subsidiary power supply unit further comprising:

a second transformer coupled to receive the constant direct current voltage output from said power input unit, for transforming the constant direct current voltage into an alternating current voltage;

a second rectifier connected to said second transformer, for rectifying the alternating current voltage from said second transformer into a second direct current voltage; and a second filter connected to said second rectifier, for filtering noise elements from the second direct current voltage output from the second rectifier and producing said third predetermined voltage to said power supply controller.

26. The computer system of claim 25, further comprised of said main body power supply unit comprising:

a third transformer coupled to receive the constant direct current voltage output from said power input unit, for transforming the constant direct current voltage into an alternating current voltage;

a third rectifier connected to said third transformer, for rectifying the alternating current voltage from said third transformer into a third direct current voltage;

a third filter connected to said third rectifier, for filtering noise elements from the third direct current voltage output from the third rectifier and producing said second predetermined voltage to the main computer body for operation;

a second on/off control unit responsive to said power supply controller, for generating a power on/off signal corresponding to a power control signal exhibiting a second logic state output from said power supply controller; and a second switching unit connected to said second on/off control unit, for limiting an input of the constant direct current voltage from said power input unit into said third transformer according to the power on/off signal.

* * * * *